Aug. 1, 1933.

H. H. ALLEN

BAG

Re. 18,905

Original Filed April 12, 1930

INVENTOR
H. H. ALLEN
BY J. S. Cook
ATTORNEY

Reissued Aug. 1, 1933

Re. 18,905

UNITED STATES PATENT OFFICE 18,905

BAG

Henry H. Allen, Huntington Bay, N. Y., assignor to Bemis Bro. Bag Company, St. Louis, Mo., a Corporation of Missouri Original No. 1,795,417, dated March 10, 1931, Serial No. 443,669, April 12, 1930. Application for reissue March 27, 1933. Serial No. 664,264

6 Claims. (Cl. 150—1.)

This invention relates generally to bags, and more specifically to bags which are formed of woven strands of material which are widely separated to produce open mesh woven material, the predominant object of the invention being to provide a bag of this type of such improved construction that the drawstring which closes the open end of the bag is a woven strand of the material of which the bag is formed.

Prior to this invention, woven bags of the general type to which this invention relates were provided with drawstrings or ties, and various methods were employed to slidingly retain the drawstrings or ties in position so that they might perform their function of drawing the open ends of the bags together to close said open ends. For instance, it has been common practice to provide bags with inturned hems at the open ends thereof for retaining the drawstrings or ties in place, and also rows of stitches have been provided which were intended to prevent the drawstrings from slipping from the necks of the bags.

None of the arrangements for retaining ties or drawstrings in place with which I am familiar functioned in an entirely satisfactory manner, and I have therefore devised the arrangement disclosed herein which, briefly stated, involves providing the bag with a drawstring which constitutes a woven strand of the material of which the bag is formed. The drawstring, which preferably is a warp thread, would in most cases be somewhat stronger and probably heavier than the other threads of which the woven fabric would be formed, or if not heavier said drawstring would be distinguishable from the other threads by being made from different material, or by being of a different color. A drawstring which constitutes a woven element of the open mesh material of the bag is slidable freely with respect to the bag material, and therefore may be drawn so as to tightly close the open end of the bag to prevent escape of the contents of said bag.

Figure 1:
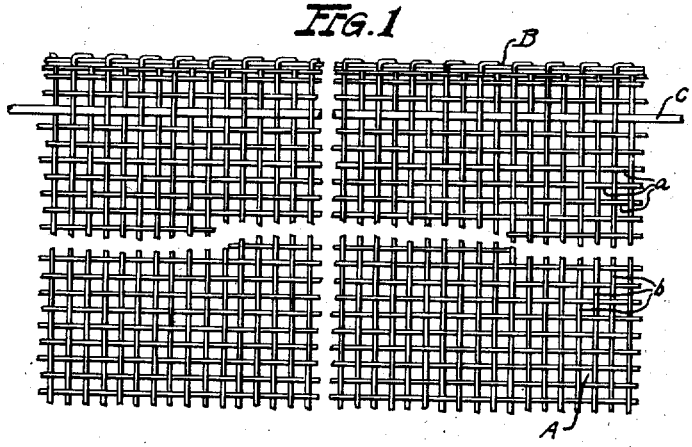
Fig. 1 illustrates a part of a web of woven material from which one of my improved bags is to be made, portions of said material being broken away to conserve space.

In the drawing, wherein are shown for the purpose of illustration, merely, two embodiments of the invention, A designates the material of which the bag is formed, said material being comprised of warp threads *a* and woof threads *b*. The threads *a* and *b* of the material A are woven in the usual manner, so that the mesh of the material is quite open, and said material A is preferably provided with a selvage B, the material A being so cut and folded that the selvage B is located at the upper, open end of the finished bag. The material A shown in Fig. 1 has a selvage at one edge only thereof, because the illustrated material constitutes a part only of the width of the entire web of material. In some cases where larger bags are being made the bag material will be provided with oppositely disposed selvage edges. Also, when two bags are made from a single width of material, this width of material will be provided with opposed selvage edges, and a pair of drawstrings will be woven into the material, one thereof adjacent to each selvage of the material, and the width of material will be cut, and a bag provided with a woven-in drawstring will be made from each section of the severed material.

Located at a point a slight distance inwardly from the selvage B of the material A is a drawstring C, which constitutes a woven strand or thread of the material A. The selvage B, as already stated herein, is preferably located at the upper open edge of the finished bag, as in Fig. 2, and the drawstring C is woven in the bag material a slight distance below this selvage. Preferably, the drawstring C is distinguishable from the other threads of which the material A is formed. For instance, the drawstring may be heavier than the other threads, as in Fig. 2, or it may be made of a different material, or colored a distinguishing color. Likewise, the drawstring may, if desired, be of a different shape, as in the case of the more or less flat drawstring C′ illustrated in Fig. 4, or a plurality of associated and closely grouped elements may be employed to provide the drawstring.

In forming my improved bag from a portion of a web of material suitable for making one bag, said web of material is folded on its center line, the fold forming one side of the bag and with the selvage B disposed at the top of the bag. The folded web is then sewed with a row of stitches D which extend from top to bottom, thus joining the two ends of the web to form the other side of the bag, and the stitches D are extended across the lower end to close the bottom of the bag. The particular type of seam illustrated in the drawing does not require that the bag be turned, but if other types of seams are employed the bag would be turned to turn in the sewed edges of the bag material.

Figure 2:
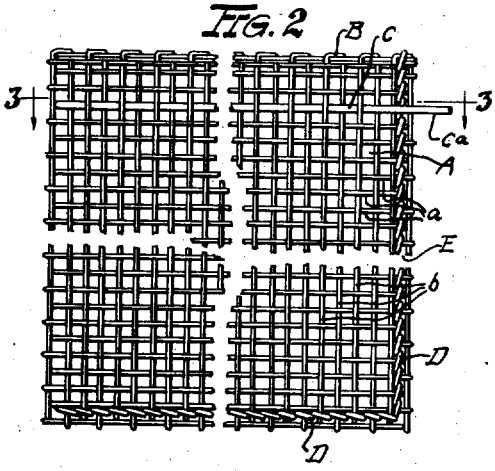
Fig. 2 is a view of a bag made in accordance with this invention, in this view, also, portions of the bag material being broken away to conserve space.
Figure 4:
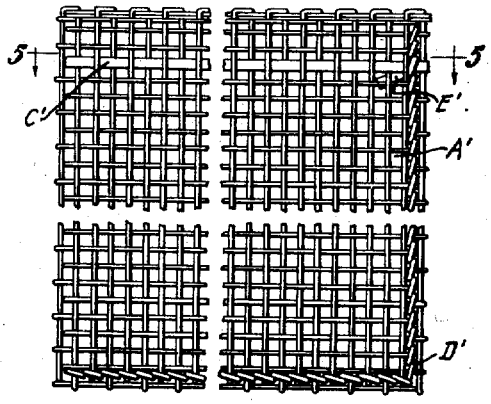
Fig. 4 is a view similar to Fig. 2 but showing another form of the invention.
Figure 3:
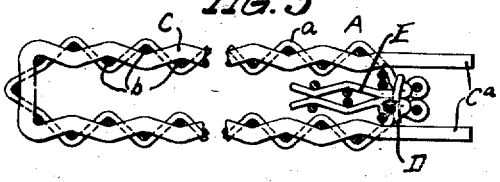
Fig. 3 is an enlarged, fragmentary section on line 3—3 of Fig. 2.
Figure 5:
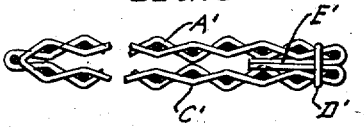
Fig. 5 is an enlarged, fragmentary section on line 5—5 of Fig. 4.

In producing the form of the bag illustrated in Figs. 2 and 3, the ends $C^a$ of the drawstring are pulled free of the side seam E before the sewing operation is performed, and in this event the drawstring will appear as illustrated most clearly in Fig. 3. However, if desired, the drawstring may be sewed into the side seam E′ of the bag, as shown in Figs. 3 and 5, wherein C designates the drawstring and A′ the material of which the bag is formed, and after the stitches D′ have been placed in the bag the drawstring C′ may be pulled or cut free of the seam. Also, if preferred, the ends of the drawstring may be permitted to remain stitched into the side seam of the bag, as shown in Figs. 4 and 5, and the mouth of the bag may be closed by pulling the drawstring from the folded side of the bag.

When the drawstring is close to the selvage B of the bag the usual method of closing the bag will be to draw up the drawstring and tie the opposite ends together. If desired, however, the drawstring may be arranged a greater distance below the selvage B, and after the mouth of the bag has been drawn to a closed condition the ends of the drawstring may be wrapped several times around the puckered mouth of the bag. The latter would be the stronger closure because all of the threads *b* of the bag material would be engaged by the drawstring, whereas in the case of the first method only half of said threads would be so engaged.

An important advantage in favor of the present invention results from the fact that the material and time necessary in providing the bags with hems at the open ends, as in some cases heretofore, is saved. Also, as the bag material of my improved bag is of quite open mesh, the open ends of the bag could not be stitched to close said open ends with success, as the stitches would pull out. My improved arrangement provides an ideal closure for such open mesh material. Likewise, when my improved structure is employed the closure strain on the material at the mouth of the bag is substantially uniform, whereby a positive closure is obtained.

I claim:

1. A bag formed of open mesh, woven fabric and a drawstring which constitutes a woven strand of said fabric, said drawstring being interwoven with substantially all of the strands of the fabric which extend transversely with respect thereto.

2. A bag formed of open mesh, plain woven strands of material and a drawstring which constitutes a woven strand of the bag-forming material, said drawstring being interwoven with substantially all of the strands of material extended transversely with respect thereto.

3. A bag formed of open mesh, plain woven strands of fabric and a drawstring which constitutes a woven strand of bag-forming fabric, said drawstring being interwoven with substantially all of the strands of fabric extended transversely with respect thereto, and being distinguishable from the other strands of the bag-forming fabric.

4. A bag formed of woven material, a drawstring which constitutes a woven strand of the woven material and which is of substantially the same length as the strands extended parallel therewith, and a seam formed at a side edge of said bag in a manner to reduce the girth of the bag with reference to the length of the drawstring so as to cause portions of said drawstring to be extended beyond the seamed side edge of the bag.

5. A bag formed of woven material, a drawstring which constitutes a woven strand of the woven material, and a seam formed at a side edge of said bag, end portions of said drawstring being sewed in said seam.

6. The bag as set forth in claim 3, wherein the drawstring strand is made heavier than the other strands of the fabric woven transversely thereto.

HENRY H. ALLEN.